United States Patent [19]

Dewez

[11] Patent Number: 4,787,662
[45] Date of Patent: Nov. 29, 1988

[54] VACUUM DRIVEN GRIPPING TOOL
[75] Inventor: John F. Dewez, San Diego, Calif.
[73] Assignee: Hewlett-Packard Company, Palo Alto, Calif.
[21] Appl. No.: 90,716
[22] Filed: Aug. 28, 1987
[51] Int. Cl.⁴ .............................................. B66C 1/02
[52] U.S. Cl. ..................................... 294/64.1; 294/65
[58] Field of Search ................ 294/64.1, 65; 414/121, 414/627, 737, 744 B, 752; 271/90, 94; 221/211; 269/21

[56]   References Cited
U.S. PATENT DOCUMENTS 1,842,383  1/1932  Bell ....................................... 294/64.1
3,556,578  1/1971  Meyers ................................. 294/64.1
4,352,440  10/1982 Fukai et al. .
4,452,557  6/1984  Bouwknegt et al. .
4,479,298  10/1984 Hug .
4,703,966  11/1987 Lewecke et al. ...................... 294/65

Primary Examiner—James B. Marbert

[57]   ABSTRACT

Apparatus for gripping workpieces using a vacuum includes a plurality of throat bores in a support block, each bore having a constricted portion of its length of a diameter such that the air flow permitted through all of the bores together is less than the pumping capacity of a vacuum pump that draws a vacuum through the bores. In a preferred embodiment, the constricted portions of the bores have a diameter of about 0.008 inches. A rubber pad affixed to the front face of the support block has pad bores therethrough corresponding to the locations of the throat bores, and also has suction cups on the front face of the pad, through which the vacuum is applied, to aid in gripping the workpiece. A vacuum manifold over the back face of the support block draws a vacuum through the bores, thereby gripping the workpiece. The constricted portion of each throat prevents overly rapid drawing of air into the vacuum manifold, so that the tool is effective for picking up workpieces even when a fraction, and indeed nearly all, of the bores are not contacting a solid surface of the workpiece and are drawing air.

19 Claims, 2 Drawing Sheets

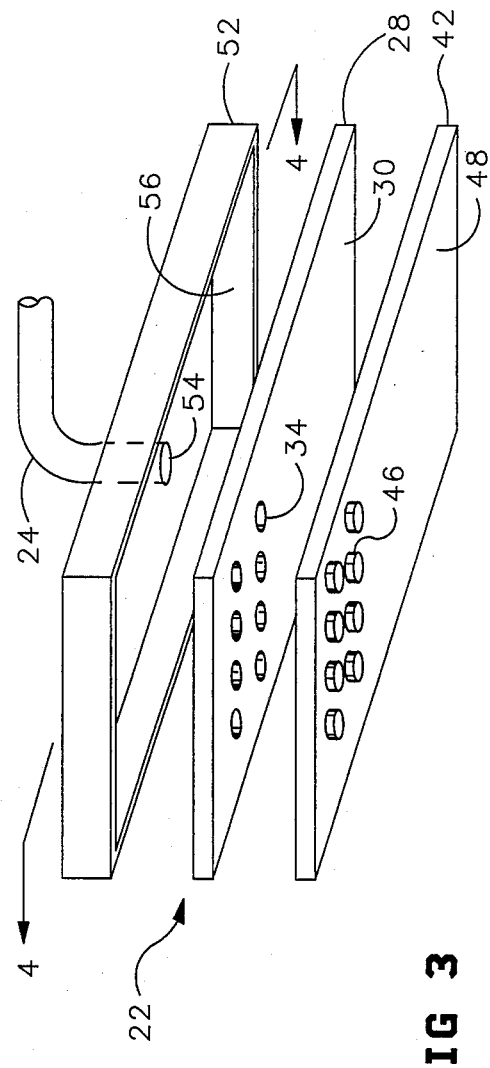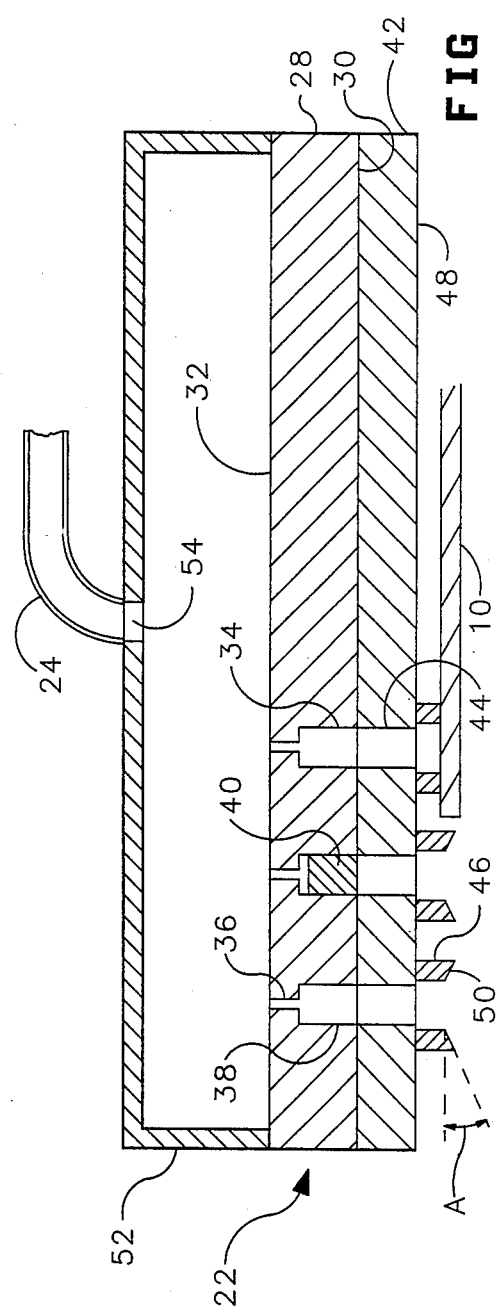

VACUUM DRIVEN GRIPPING TOOL

BACKGROUND OF THE INVENTION

This invention relates to tools for gripping workpieces, and, more particularly, to a vacuum activated tool for grasping and picking up irregular pieces from a stack.

Increasing use of automation is a key to improving productivity in factory assembly operations. An important problem in the field of automation is the gripping, picking up, and moving of workpieces that are to be processed. For example, in automated electronics assembly operations it is necessary to grip and manipulate the circuit boards to which electronic devices and assemblies are attached. The motivation for the present invention is the need for a tool to pick up one, and only one, circuit board from a stack and then to move the board to an assembly location.

Printed circuit boards are thin, generally flat but often slightly warped, boards made of an electrically nonconducting material such as a resin. The circuit boards are available in a variety of thicknesses and lateral dimensions as needed for specific applications, but generally are about 0.030 to about 0.060 inches thick and of lateral dimensions of, for example, 2 inches by 4 inches to 6 inches by 10 inches. The boards are made of a polymeric resin that is slightly flexible, but can be cracked if tightly or irregularly gripped, as by a pliers.

The printed circuit boards are used to mount and interconnect the active and passive electronic components of an electronic system. For example, a number of integrated circuits, switches, resistors, capacitors, transformers, and the like, as required for any particular circuit, are mounted onto the board during the assembly operation. The components are connected with wires or conducting strips, and also connected to terminal strips that are usually provided at one end of the circuit board. The completed circuit boards are mounted in racks or holders in the electronic apparatus, and interconnected through the terminal strips. This modular approach makes possible the replacement of particular subsystems of a large, complex system by simply replacing one of the circuit boards.

The circuit boards are prepared by forming a sheet of the resin material and cutting it to the required size. Holes are punched or cut into the resin at the proper locations to mount the electronic components. Conducting strips and terminals strips are mounted on the board, and finally the components are added and interconnected.

Since much of the assembly work is repetitive in nature, robot devices have been developed to perform certain of the assembly functions such as placing the components onto the board and joining the components. Mechanical manipulators can be used to grasp and pick up the boards to move them between operations, but the use of mechanical manipulators for grasping the circuit boards has several drawbacks. The circuit boards are easily bent and cracked if they are grasped too tightly. If the circuit board has been preprinted with a metallic conductor pattern, the metal may be damaged or the pattern may be altered. Also, it is difficult for a mechanical robot hand to pick up just one thin circuit board from a stack. This problem is exacerbated when the stack of circuit boards includes boards of different sizes or orientations. Existing vacuum tools cannot be used to grasp the circuit boards, as the holes in the boards cause loss of vacuum and an inability to form a vacuum seal between the tool and the board.

No suitable approach has been proposed for grasping circuit boards, as to pick them up, one by one, from a stack, and for moving them to another location. A need therefore exists for such a tool, to permit further automation of the assembly operation. The present invention fulfills this need, and further provides related advantages.

SUMMARY OF THE INVENTION

The present invention is embodied in an apparatus or tool for gripping articles of irregular size, which may have holes therein and may be fragile. The apparatus gently grasps the article, virtually eliminating the possibility of breakage as a result of the grasping. Articles of a range of sizes can be grasped firmly but gently, regardless of the presence of holes in the articles. The top article in a stack can be grasped without disturbing articles further down in the stack, even when the top article is smaller in size than the article below it and is oriented in a random manner. The apparatus is not complex in construction and has no moving parts, and therefore can be constructed inexpensively from readily available materials. The apparatus has no valves, other than one master control normally provided external to the apparatus, and has high reliability. A complex control system is not required. The apparatus can be used in dirty, dusty, or otherwise adverse environments.

In accordance with the invention, apparatus for gripping an article comprises vacuum source means for supplying a vacuum; and a plurality of vacuum conduction tubes, a first end of at least some of said tubes being positioned to contact a surface of an article to be gripped and a second end communicating with the vacuum source means, at least a portion of the length of each of the tubes having a constricted cross sectional area such that the total air flow, under vacuum, possible through all of the tubes taken together is less than a preselected pumping capacity. The preselected pumping capacity is usually the pumping capacity available through the vacuum source means. A constricted area equivalent to a cylindrical diameter of from about 0.005 to about 0.010 inches, and most preferably 0.008 inches, is preferred.

The first ends of at least some of the tubes, termed contacting tubes, are positioned adjacent the gross surface of the article to be grasped. Application of the vacuum then causes the article to be grasped by the applied suction so that it can be lifted and moved. It may be, and often is, the case that some of the tubes, herein termed noncontacting tubes, do not contact the surface of the article, because the article is too small to contact all of the tubes, because the surface of the article is irregular, or because there are holes in the article corresponding to the location of some of the tubes. In this case, the portion of the noncontacting tubes having a small or constricted cross sectional area prevents too high a flow of air that would cause the vacuum on the contacting tubes to be lost because the pumping capacity is exceeded. Thus, there can be a set of both contacting tubes and noncontacting tubes, which cannot be predicted beforehand for grasping any particular article, and the air flow through the noncontacting tubes does not result in a loss of vacuum, and thence grasping ability, in the contacting tubes. Only the top article in a stack, which is actually contacted by the contacting tubes, is grasped and lifted. Articles of different sizes and shapes, and with holes therein, can thus be grasped gently by a vacuum force using a single apparatus. The apparatus uses no sensing mechanism to determine the noncontacting tubes, and is therefore not complex in construction.

In a particularly important application, the tool of the invention can be specially adapted for picking up substantially flat plates such as circuit boards. The tubes are then made as bores in a support block that is used to grasp the plates.

In accordance with this embodiment of the invention, apparatus for gripping an article comprises support means for applying a vacuum induced force to the articles, the support means including a support block havig a front face with a shape substantially conforming to that of the article, and a back face, and a plurality of throat bores therethrough communicating with the back face, the cross sectional area of at least a portion of the length of each of the throat bores being equal to that of a cylinder having a diameter of from about 0.005 to about 0.010 inches; and vacuum application means for simultaneously applying a vacuum to all of the throat bores. The throat bores are preferably substantially identical in shape and size, and have cylindrical constricted portions having a diameter of about 0.008 inches.

The support block is desirably supplied with a rubber pad affixed to the front face thereof, and which has bores therethrough corresponding to the throat bores in the support block. The vacuum then acts on the grasped article through the pad bores as well as the throat bores. The pad preferably has slightly protruding suction cups on its front face to actually contact the grasped article, a suction cup for each vacuum applying bore. The suction cups have recessed centers, preferably recessed at an angle of about 15 degrees from the plane of the front face. The bores communicate with the interiors of the respective suction cups. When a suction cup is pressed against the surface of the article, it forms a tight seal with the surface that promotes drawing a vacuum within the suction cup, which in turn produces a solid grasping of the article. The use of a rubber pad and suction cups permits grasping of generally flat articles that are warped or otherwise irregular in a manner that would defeat the formation of a vacuum contact between the contacting tubes (or bores) and the article, in those areas where grasping is possible. The rubber pad and suction cups are preferably made of a rubber having a durometer reading of about 15, and are therefore somewhat flexible and pliable.

In accordance with a particularly preferred embodiment of the invention, apparatus for gripping printed circuit boards comprises a support block having a substantially flat support block front face and a support block back face; a plurality of cylindrical throat bores communicating between the support block front face and the support block back face, the cross sectional area of at least a constricted portion of the length of each of said throat bores having a diameter of from about 0.005 to about 0.010 inches; a pad made of a rubbery material and having a pad back face affixed to the support block front face, and a pad front face, the pad having a plurality of pad bores therethrough, one pad bore for each of the throat bores and positioned to communicate therewith, and a plurality of suction cups on the pad front face and extending above the pad front face, one suction cup for each of the pad bores and positioned to communicate therewith; and a vacuum manifold affixed to the support block and communicating with the support block back face, so that a vacuum is applied to all of the throat bores from a common source.

It will be appreciated that the present invention provides an advance in grasping apparatus that can be used to gently grasp irregular articles of a range of sizes, which may have holes or openings therein. Although it is possible to imagine the construction of a mechanical robot hand to accomplish the same functions as the apparatus of the invention, such a robot hand would be complex in construction and require extensive software. Other features and advantages of the invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is an exploded perspective view of the apparatus of FIG. 2; and

FIG. 4 is a side sectional view of the apparatus of FIG. 2, taken generally along lines 4—4.

DETAILED DESCRIPTION OF THE PREFERRED EMBODIMENT

Figures 1, 2:
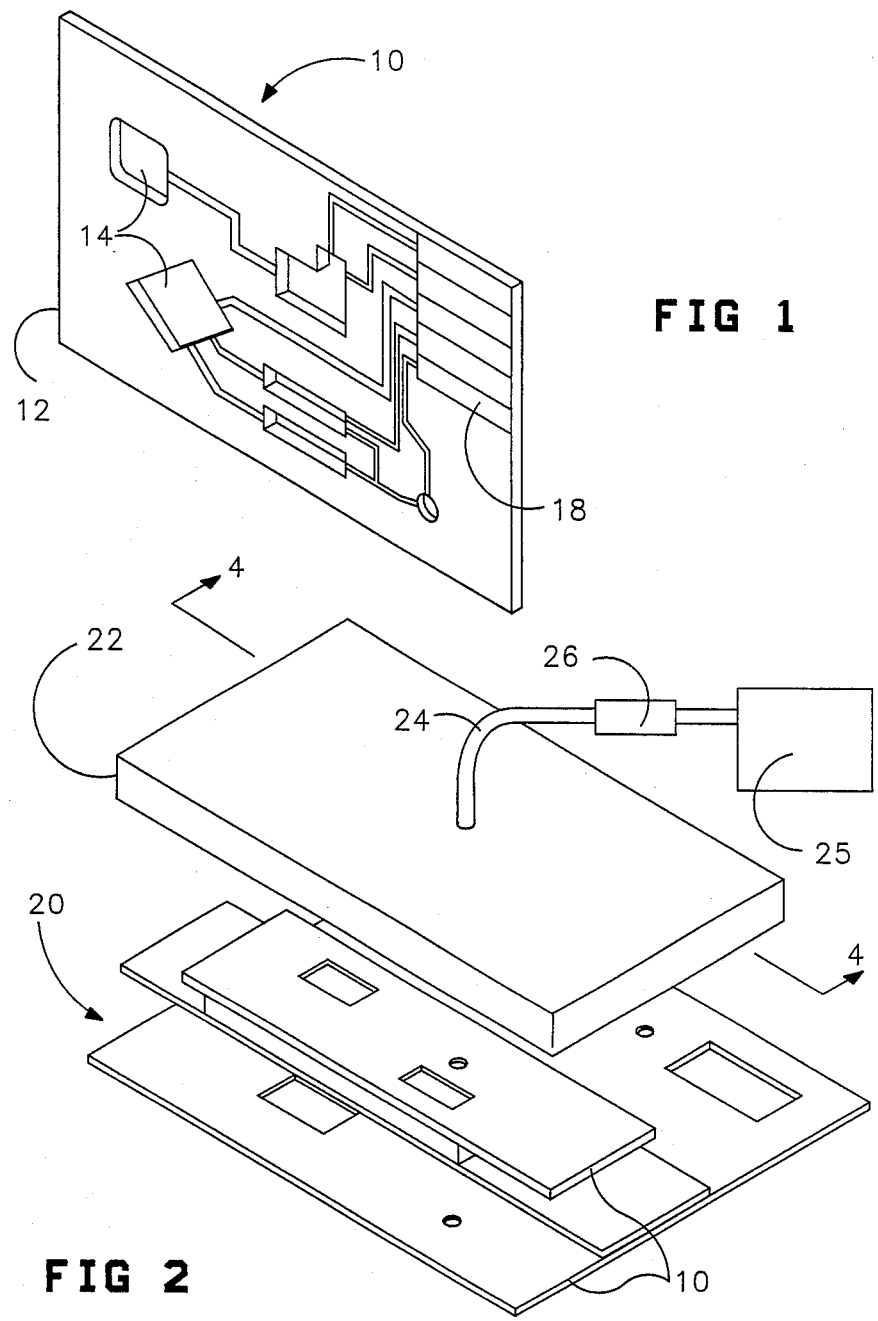
FIG. 1 is a perspective view of an exemplary printed circuit board.
FIG. 2 is a perspective view of a stack of printed circuit boards with the apparatus of the invention.

The preferred embodiment of the invention is used to grasp printed circuit boards. FIG. 1 illustrates such a printed circuit board, and FIG. 2 shows the nature of the typical use of the apparatus of the invention in grasping one of such boards from a stack. Referring to FIG. 1, a printed circuit board 10 is typically a thin, generally rectangular plate 12 formed from an electrically rectangular plate 12 formed from an electrically nonconductive resin material. The plate 12 often has a number of holes 14 therethrough, the position and shape of the holes being dictated by the particular circuit components (not shown) to be assembled on that circuit board. Optionally, there may be conductive strips 16 prefabricated on the circuit board 10, to provide integral connections between the components that are to be subsequently added. There is usually a terminal strip 18 at one end or on a side of the plate 12, that provides the external connections for the circuit fabricated on the circuit board 12.

In a commonly occurring situation, illustrated in FIG. 2, a stack 20 of circuit boards 10, of differing sizes, shapes, and patterns of holes 14, is provided in an assembly area. One board 10 at a time is to be lifted from the stack 20 and transported to an assembly work station for further assembly operations, or moved to another location. The present invention provides an apparatus 22 for the purpose of gripping the top circuit board 10, and only that top board, without disturbing the underlying boards 10. The top board 10 is then lifted off the stack. The gripping action is produced by application of a vacuum to the apparatus 22, provided through an external vacuum line 24 from a vacuum pump 25, and controlled by a single vacuum valve 26 that is in the line 24. The apparatus 22 does not exclude the use of an integral vacuum valve therein, but in the preferred embodiment the valve is separate from the apparatus 22 for convenience and simplicity of construction.

Details of the construction of the preferred apparatus 22 are shown in exploded view in FIG. 3, and in section in FIG. 4. The apparatus 22 is constructed of three sections for ease of manufacture, and the sections are joined together during operation, as with an adhesive or a clip. A support block 28 is a rectangular prism of metal or other material such as plastic, having a generally flat support block front face 30 and a generally flat support block back face 32. The support block 28 has a plurality of throat bores 34 extending between, and creating communication between, the front face 30 and the back face 32. The throat bores 34 are preferably right circular cylinders for ease of manufacture, but may be of other shapes. In a presently most preferred version of the apparatus 22, there are 143 such throat bores between the front and back faces, which faces have dimensions of 5 inches by 2.4 inches.

The throat bore 34 includes a constricted portion 36. The diameter of the constricted portion 36 is from about 0.005 to about 0.010 inches, and preferably about 0.008 inches. (If the bore is constructed to have a shape other than a circular cylinder, the cross sectional area of the constricted portion 36 should have the same area as circles of the indicated diameters.) These dimensions are critical to the operation of the device in the indicated dimensions, when operated from a manufacturing vacuum source. If the diameter is significantly larger, then too great a flow of air is produced through those throat bores 34 that are not in contact with the circuit board 10 (i.e., the noncontacting bores) and a sufficient vacuum cannot be achieved in the throat bores 34 that are in contact with the circuit board 10 (i.e., the contacting bores).

In the more general form of the invention, the specific diameters stated in the preceding paragraph are not limiting of the invention, but the size of the bores is selected in relation to the total number of bores and the pumping capacity of the available vacuum system. The pumping capacity determines a preselected value of the vacuum pumping capacity of the apparatus. The total flow rate of air through the bores must be less than this preselected value, or all of the pumping capacity may be lost through those bores that are not contacting a workpiece. That is, a large vacuum pump having a large pumping capacity establishes a large preselected value. The total constricted area of all of the bores taken together permits a particular air flow when open to the air and under the preselected value of the applied vacuum. If the air flow through the bores exceeds the preselected value, then no vacuum can be drawn to lift workpieces because the vacuum pumping capacity is lost through the open bores. The constricted area of the bores and the number of bores are therefore chosen so that the air flow therethrough is less than the preselected value.

In the preferred embodiment, the throat bores 34 also have an unconstricted portion 38, having a diameter greater than that of the constricted portion 36. The larger diameter portion 38 is provided to reduce the likelihood of plugging of the throat bore 34 by dust or dirt that may be present in a dirty environment, because the larger diameter provides very little air current flow that would tend to draw dust or dirt into the interior of the throat bore 34. The larger diameter portion 38 also permits the insertion of a filter element 40 into the throat bore 34, as illustrated for one of the throat bores 34 in FIG. 4. The filter element 40 can be a fiber element designed for this purpose, but could also be simply a piece of cotton placed into the unconstricted portion 38.

Affixed to the support block front face 30, as with tape, adhesive, mechanical fastener, or the like, is a pad 42 made of a pliable, rubbery material. The purpose of the pad 42 is to aid in conforming the vacuum connection through the throat bores 34 to the shape of the surface of the circuit boards 10. The front face 30 of the rigid support block 28 is flat and does not itself conform to an irregular circuit board that has slight waves or bends, in the absence of the pad 42. The pad 42 aids in achieving a series of good vacuum lifting connections to the board 10 by conforming to slight irregularities in the board 10 to be lifted.

The pad 42 has a plurality of pad bores 44 therethrough, whose shape and location conform to the corresponding throat bores 34, so that the vacuum established in the throat bores 34 is communicated to the pad bores 44. The pad bores 44 do not provide a constriction to air flow, and are preferably of a diameter about that of the diameter of the unconstricted portion 38. As a further aid to improving the vacuum contact to the circuit board 10, a plurality of suction cups 46 is provided on a front face 48 of the pad 42. The suction cups 46 are in the form of raised toroids extending above the front face 48 of the pad 42, and made of the same rubbery material as the pad 42. In the most preferred embodiment, the suction cups 46 extend about 0.050 inch above the front face 48 of the pad 42. One suction cup 46 is provided on each of the pad bores 44, so that the pad bore 44 communicates with the interior of the suction cup 46. A front surface 50 of each suction cup 46 is recessed, preferably at an angle A shown in FIG. 4 of about 15 degrees to the plane of the front face 48. As illustrated for one of the suction cups 46 in FIG. 4, when a circuit board 10 is placed over the end of the suction cup 46 and a vacuum is applied, the suction cup 46 deforms slightly as the vacuum draws the apparatus 22 and the circuit board 10 together, forming a tight, leak free seal to maximize the holding power of that particular contacting bore. For the noncontacting bores, the suction cup 46 does not deform and there is a minimal and acceptable leak through the constricted portion 36.

The material of construction of the pad 42 and the integrally molded suction cups 46 determines in part its ability to conform to an irregular surface of the circuit board and to seal the contacting cups to the circuit board. The pad is preferably constructed of a rubbery material, such as a silicone rubber, that can be deformed to effect the sealing and conforming action. The deformability of the rubber is characterized by its Shore A durometer hardness reading, a standardized test that is used for measuring the extent of the deformation of rubber under an indenter. The rubber that is used for the pad 42 and suction cups 46 preferably has a hardness 15 durometer Shore A measurement. Substantially stiffer rubbers do not afford sufficient deformability to improve the performance of the apparatus 22 over that obtainable with a fully rigid construction. Substantially more flexible rubbers may deform too much under the vacuum force, and seal the pad bores 44 unintentionally.

On the other side of the support block 28, opposite to the pad 42, is a vacuum manifold 52 affixed to the support block back face 32. The vacuum manifold 52 is a hollow solid block that communicates with the vacuum line 24 through a vacuum port 54 in the vacuum manifold 52. The hollow interior 56 of the manifold 52 distributes the vacuum throughout the interior, and in particular permits communication with the throat bores 34. Application of a vacuum to the common source vacuum line 24 is thereby communicated to each and every one of the throat bores 34, the pad bores 44, and thence to the interior of the suction cups 46 to act against a solid surface such as the circuit board 10, if presented.

In operation, a vacuum is applied to the apparatus 22 through the vacuum line 24. The vacuum creates an air flow inwardly toward the vacuum source, through the interior of the suction cups 46, the pad bores 44, and the throat bores 34. Because of the constricted portion 36 in the throat bores 34, the air flow through any one or combination of bores 34 and 44 is small. Even with this reduced rate of air flow, the full power of the vacuum can be applied to any article that is placed over the front surface 50 of the suction cup 46 and seals thereto. That the other, noncontacting bores are not sealed and continue to leak air does not prevent the function of the contacting bores. It is therefore possible to grip and lift circuit boards when a portion of the bores do not contact the board at all, or happen to be placed over the holes in the board.

Tests were conducted using a preferred apparatus 22 having a throat diameter of the constricted portion 36 of 0.008 inches. The apparatus had 143 such bores over a frontal surface area of 5 inches by 2.4 inches. A forepump vacuum was applied to the vacuum line. A definite vacuum-induced gripping force could be felt when a circuit board was placed in contact with only one of the 143 suction cups. This force was not sufficient to lift the circuit board due to its weight. Contact to about ¼ of the suction cups was sufficient to provide a sufficient gripping force to lift the circuit board, which had dimensions of 6 inches long by 6 inches wide by 0.050 inches thick and had numerous holes therethrough. This particular design is sufficient to lift electronics circuit boards, but other optimized designs can be used for other sizes and shapes of articles.

In further tests, it was found that the preferred apparatus lifted a single circuit board from the top of the stack, in the situation illustrated in FIG. 2. The remaining circuit boards were not moved or disturbed. After removing the top circuit board, the second board in the stack was later removed in a similar manner, without any adjustment of the apparatus 22 to account for the face that the second circuit board in the stack was of an entirely different size and shape, and had a different pattern of holes, as compared with the previously removed first circuit board in the stack.

Thus, the apparatus of the invention permits objects to be grasped and lifted from stacks, and moved readily, even though the objects vary in size. The tool of the invention thereby provides a simply constructed, reliable and efficient method for manually or robotically moving such articles. Although a particular embodiment of the invention has been described in detail for purposes of illustration, various modifications may be made without departing from the spirit and scope of the invention. Accordingly, the invention is not to be limited except by the appended claims.

What is claimed is:

1. Apparatus for gripping an article, comprising;
   vacuum source means for applying a vacuum; and
   a plurality of vacuum conduction tubes, a first end of at least some of said tubes being positioned to contact a surface of an article to be gripped and a second end communicating with said vacuum source means, at least a portion of the length of each of said tubes having a constricted cross sectional area such that the total air flow, under vacuum, possible through all of said tubes taken together is less than a preselected pumping capacity.

2. The apparatus of claim 1, wherein the cross sectional area of the constricted portion of each of said tubes is equal to that of a cylinder having a diameter of from about 0.005 to about 0.010 inches.

3. The apparatus of claim 2, wherein the cylinder has a diameter of about 0.008 inches.

4. The apparatus of claim 1, further including
   a support block through which said tubes extend, said tubes thereby becoming bores through said support block.

5. The apparatus of claim 1, wherein said vacuum conduction tubes are unvalved.

6. Apparatus for gripping an article, comprising:
   support means for applying a vacuum induced force to the articles, said support means including
      a support block having a front face with a shape substantially conforming to that of the article, and a back face, and
      a plurality of throat bores therethrough communicating with said back face and said front face, the cross sectional area of at least a portion of the length of each of said throat bores being equal in value to that of a cylinder having a diameter of from about 0.005 to about 0.010 inches; and
   vacuum application means for simultaneously applying a vacuum to all of said throat bores.

7. The apparatus of claim 6, wherein said throat bores further include an unconstricted portion having a cross sectional area greater than that of a cylinder having a diameter of about .010 inches.

8. The apparatus of claim 6, further including
   pad means for contacting the article along a contact face thereof, said pad means being affixed to said support block along said front face, and having a plurality of pad bores therethrough corresponding in location to said throat bores in said support block.

9. The apparatus of claim 8, further including
   suction cup means on the contact face of said pad means for conforming to the article, including a suction cup for each of said throat bores.

10. The apparatus of claim 9, wherein said suction cups are integral with said pad means.

11. The apparatus of claim 8, wherein said pad means is made of a rubber having a durometer reading of about 15.

12. The apparatus of claim 6, wherein said vacuum application means includes a vacuum manifold communicating with said back face of said support block.

13. Apparatus for gripping printed circuit boards, comprising:
   a support block having a substantially flat support block front face and a support block back face;
   a plurality of cylindrical throat bores communicating between said support block front face and said support block back face, the cross sectional area of at least a constricted portion of the length of each of said throat bores having a diameter of from about 0.005 to about 0.010 inches;
   a pad made of a rubbery material and having a pad back face affixed to the support block front face, and a pad front face, the pad having a plurality of pad bores therethrough, one pad bore for each of said throat bores and positioned to communicate therewith, and a plurality of suction cups on said pad front face and extending above said pad front face, one suction cup for each of said pad bores and positioned to communicate therewith; and a vacuum manifold affixed to said support block and communicating with said support block back face, so that a vacuum is applied to all of said throat bores from a common source.

14. The apparatus of claim 13, wherein each of said throat bores has a variation in cross sectional area along its length, and includes a portion having a diameter larger than from about 0.005 to about 0.010 inches.

15. The apparatus of claim 13, wherein said constricted portion of each throat has a diameter of about 0.008 inches.

16. The apparatus of claim 13, wherein each of said suction cups has a recessed center, so that the cup can longitudinally compress when gripping a circuit board.

17. The apparatus of claim 16, wherein the recessed center is recessed at an angle of about 15 degrees from the plane of the said front face.

18. The apparatus of claim 13, wherein said vacuum manifold includes a plurality of internal supports contacting said support block back face.

19. The apparatus of claim 13, wherein said pad is made of rubber having a durometer reading of about 15.

* * * * *